United States Patent
Bok et al.

(10) Patent No.: US 11,904,803 B2
(45) Date of Patent: Feb. 20, 2024

(54) SYSTEM FOR AND METHOD OF WIRELESS COMMUNICATION WITH SEAT BELT

(71) Applicants: HYUNDAI MOTOR COMPANY, Seoul (KR); KIA CORPORATION, Seoul (KR); SAMSONG INDUSTRIES, LTD., Seoul (KR)

(72) Inventors: Chang Kyu Bok, Seoul (KR); Dong Ryul Shin, Busan (KR); Su Cheon Kim, Incheon (KR); Yong Chan Yoon, Seoul (KR); Man Seok Kim, Changwon-si (KR)

(73) Assignees: HYUNDAI MOTOR COMPANY, Seoul (KR); KIA CORPORATION, Seoul (KR); SAMSONG INDUSTRIES, LTD., Seoul (KR)

(*) Notice: Subject to any disclaimer, the term of this patent is extended or adjusted under 35 U.S.C. 154(b) by 0 days.

(21) Appl. No.: 17/890,673

(22) Filed: Aug. 18, 2022

(65) Prior Publication Data
US 2023/0242069 A1     Aug. 3, 2023

(30) Foreign Application Priority Data
Jan. 28, 2022    (KR) ........................ 10-2022-0013319

(51) Int. Cl.
    *B60R 22/48*       (2006.01)
    *G08C 17/02*       (2006.01)
    *H04L 12/10*       (2006.01)

(52) U.S. Cl.
CPC ............. *B60R 22/48* (2013.01); *G08C 17/02* (2013.01); *H04L 12/10* (2013.01); *B60R 2022/4816* (2013.01)

(58) Field of Classification Search
CPC ....... B60R 22/48; B60R 16/00; B60R 16/023; B60R 16/027; G01C 21/00; G01C 21/26; G07C 5/00; G07C 5/02; G07C 5/08
See application file for complete search history.

(56) References Cited

U.S. PATENT DOCUMENTS 9,417,078 B1 *   8/2016   Seibert .................. G01C 21/26
11,117,546 B2     9/2021   Cuddihy et al.
(Continued)

FOREIGN PATENT DOCUMENTS

| JP | 2019-001365 A | 1/2019 |
| JP | 2020-189595 A | 11/2020 |
| KR | 10-2309421 B1 | 10/2021 |

OTHER PUBLICATIONS

NPL Search (Jul. 19, 2023).*

*Primary Examiner* — Van T Trieu
(74) *Attorney, Agent, or Firm* — MCDONNELL BOEHNEN HULBERT & BERGHOFF LLP

(57) ABSTRACT

A system for and a method of wireless communication with a seat belt includes a seat belt sensor provided on a per-seat basis and configured to detect whether or not a seat belt is fastened, a secondary controller provided on a per-seat basis and configured to wake up through wireless communication with a vehicle, to transmit a secondary data signal, including a state of a buckle that is detected by a seat belt sensor, through the wireless communication, and to switch to a sleep state after the secondary data signal is transmitted, and a primary controller provided in the vehicle and configured to receive and store the secondary data signal wirelessly transmitted by each of the secondary controllers and to transmit the stored secondary data signal to a vehicle system controller.

12 Claims, 4 Drawing Sheets

(56) References Cited

U.S. PATENT DOCUMENTS

2005/0061568 A1    3/2005  Schondorf et al.
2017/0140583 A1*  5/2017  Seibert .................... H04L 67/12
2022/0097649 A1*  3/2022  Bok ...................... B60R 16/023

* cited by examiner

SYSTEM FOR AND METHOD OF WIRELESS COMMUNICATION WITH SEAT BELT

CROSS REFERENCE TO RELATED APPLICATIONS

The present application claims priority of Korean Patent Application No. 10-2022-0013319 filed on Jan. 28, 2022, the entire contents of which is incorporated herein for all purposes by this reference.

BACKGROUND

Field of the Disclosure

The present disclosure relates to a system for and a method of wireless communication with a seat belt, both of which are capable of wirelessly detecting whether or not a seat belt provided on a per-seat basis is fastened and of blocking supplying of electric power in a case where wireless communication is unnecessary, thereby reducing consumption of the electric power of a battery.

Description of the Related Art

A seat belt reminder (SBR) apparatus is an apparatus that, by providing a warning light or warning sound, recommends that an occupant sitting on a seat wear his/her seat belt, in a case where the occupant does not wear his/her seat belt while a vehicle travels at or above a predetermined speed.

In the SBR apparatus, a buckle and an integrated central control unit (ICU) are electrically connected to each other through wiring. Thus, when the seat belt is fastened to the buckle, a buckle fastening signal is transferred to the ICU, and the ICU is connected to a vehicle control unit through communication, thereby notifying the occupant whether or not the seat belt is fastened.

In an existing SBR apparatus, a seat belt reminder sensor and seat belt sensors are connected to the ICU through wiring within a vehicle seat.

Moreover, in recent years, with an increase in the number of various sensors in addition to the seat belt reminder sensor and the seat belt sensor, the length, weight, and cost of wires have increased. Thus, there occurs a problem in dealing with wiring.

Particularly, with an increase in the number of electrical sensors within a vehicle seat, various sensors and an ECU controlling the various sensors remain turned on at all times without being turned off. Thus, there also occurs a problem in that consumption of electric power of a battery in the vehicle is increased.

The foregoing is intended merely to aid in understanding the background of the present disclosure and therefore should not be interpreted to admit that the present disclosure falls within the purview of the related art that is already known to a person of ordinary skill in the art.

SUMMARY

An objective of the present disclosure, which is made to solve the above-mentioned problems, is to provide a system for and a method of wireless communication with a seat belt, both of which are capable of wirelessly detecting whether or not a seat belt provided on a per-seat basis is fastened and of blocking supplying of electric power in a case where wireless communication is unnecessary, thereby reducing consumption of the electric power of a battery.

In order to achieve the above-mentioned object, according to an aspect of the present disclosure, there is provided a system for wireless communication with a seat belt including a seat belt sensor provided on a per-seat basis and configured to detect whether or not a seat belt is fastened, a secondary controller provided on a per-seat basis and configured to wake up through wireless communication with a vehicle, to transmit a secondary data signal, including a state of a buckle that is detected by a seat belt sensor, through the wireless communication, and to switch to a sleep state after the secondary data signal is transmitted, and a primary controller provided in the vehicle and configured to receive and store the secondary data signal wirelessly transmitted by each of the secondary controllers and to transmit the stored secondary data signal to a vehicle system controller.

The secondary controller may wirelessly receive a wake-up signal in a sleep state of the secondary controller and switch to a wake-up state.

In a case where ignition is turned on or off, in a case where the buckle is fastened in a turned-on state of the ignition or where the fastened buckle is unfastened in the turned-on state thereof, or in a case where a predetermined period elapses in the turned-on state of the ignition, the wake-up signal may be received.

The secondary controller may be initialized after the secondary controller receives the wake-up signal, and, in a case where the initialization is successful, each of the secondary controller may transmit the secondary data signal.

The secondary data signal for the state of the buckle may be a signal for a fastened state of the buckle.

The secondary data signal may further include a signal for a state of a battery built into the secondary controller and a signal for a malfunctioning state of each of the secondary controllers.

In a case where the primary controller properly receives the secondary data signal, the secondary controller may switch to the sleep state.

In a case where the mater controller properly receives the secondary data signal, the primary controller may wirelessly transmit a reception acknowledgement signal to the secondary controller.

In a case where the wake-up signal received by the secondary controller is a wake-up signal indicating that ignition is turned on or off or indicating a fastened state of the buckle, a wake-up signal transmission timer of the secondary controller may be turned on and then the secondary controller may switch to the sleep state.

In a case where the primary controller does not properly receive the secondary data signal, the secondary controller may retransmit the secondary data signal, and, when the number of times the secondary data signal is retransmitted is greater than a predetermined number of times, the secondary controller may switch to the sleep state.

In a case where the wireless communication between the secondary controller and the primary controller is unnecessary, supplying of electric power to the secondary controller may be blocked by causing the secondary controller to switch to the sleep state.

The wake-up signal may be transmitted through a low-frequency (LF) transmitter that is a device in the vehicle that transmits a signal at a low frequency, and may be received through an LF receiver provided in the secondary controller.

According to another aspect of the present disclosure, there is provided a method of wireless communication with a seat belt including causing each secondary controller to wake up through wireless communication in a sleep state of the each secondary controller, transmitting, by the each secondary controller, a secondary data signal including a state-of-a-buckle signal resulting from detection by a seat belt sensor provided on a per-seat basis, through the wireless communication, receiving and storing, by a primary controller, the secondary data signal wirelessly transmitted from the each secondary controller and transmitting, by the primary controller, the stored secondary data signal to a vehicle system controller, and causing the secondary controller to switch to the sleep state after the secondary data signal is transmitted.

In the system for and the method of wireless communication with a seat belt according to the present disclosure, the secondary controller provided on a per-seat basis and a single primary controller provided in the vehicle are connected to each other through the wireless communication and a function of reminding an occupant of fastening his/her seat belt is wirelessly performed. Particularly, in a situation where the wireless communication between the secondary controller and the primary controller is unnecessary, supplying of electric power of a battery to the secondary controller is blocked by causing the secondary controller to switch to the sleep state. Thus, the advantageous effect of greatly reducing consumption of the electric power of the battery by the secondary controller can be achieved.

BRIEF DESCRIPTION OF THE FIGURES

The above and other objects, features and other advantages of the present disclosure will be clearly understood from the following detailed description when taken in conjunction with the accompanying drawings, in which.

DETAILED DESCRIPTION

Figure 1:
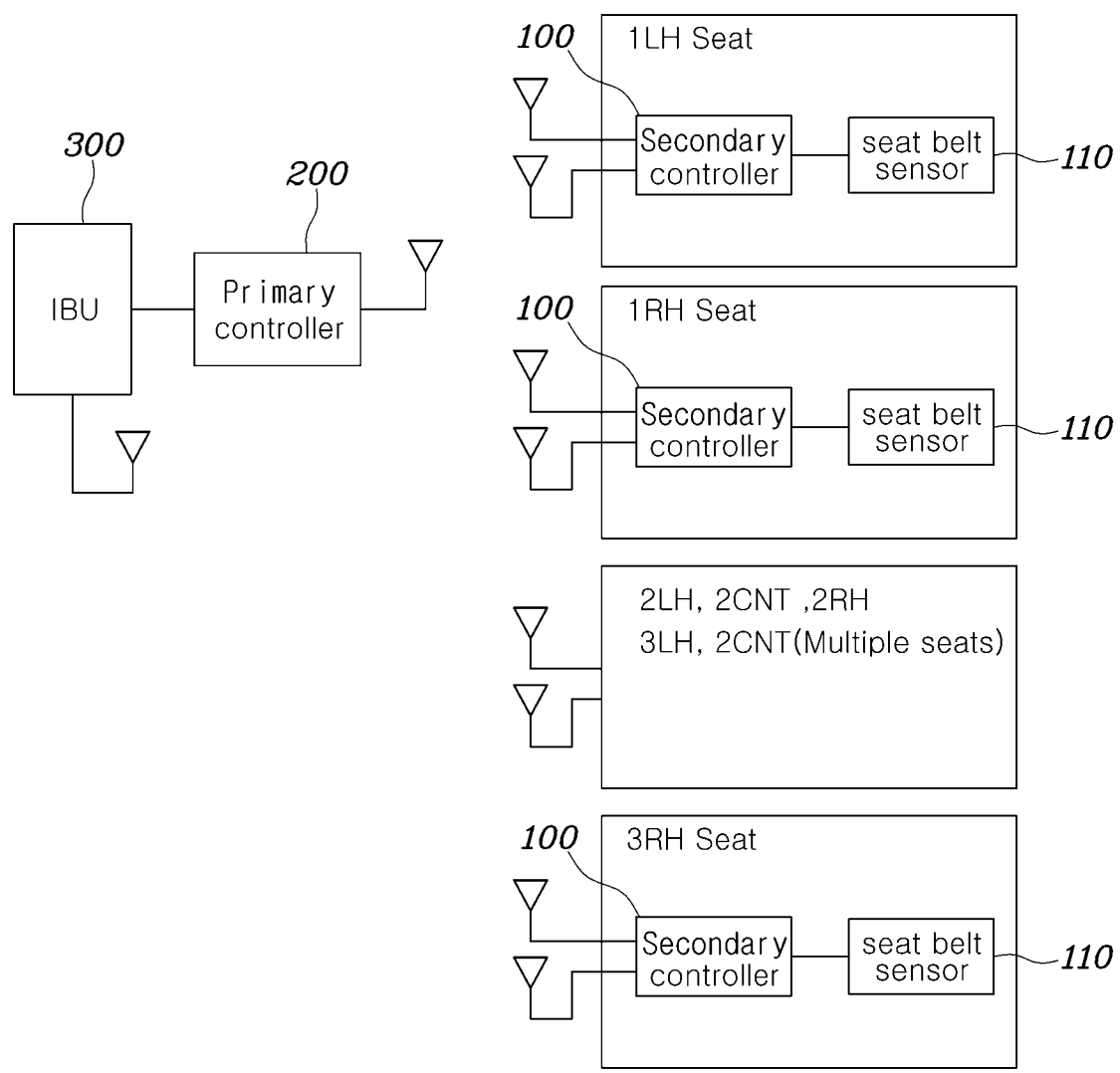
FIG. 1 is a view schematically illustrating a configuration of a system for wireless communication with a seat belt according to the present disclosure.

An exemplary embodiment of the present disclosure that is disclosed in the present specification will be described in terms of specific structures and functions for the purpose of illustration. However, the present disclosure may be practiced in various forms and should not be construed as being limited to the exemplary embodiment described in the present specification.

Various modifications may be made in various ways to the embodiment of the present disclosure. Among these, a specific embodiment will be described in detail below with reference to the accompanying drawings. However, this description is not intended to limit the technical idea of the present disclosure to a specifically disclosed embodiment. All alterations, equivalents, and substitutes that are included within the scope of the technical idea of the present disclosure should be understood as falling within the scope of the present disclosure.

The terms first, second, and so on may be used to describe various constituent elements, but should not be construed to impose any limitation on the meanings of the constituent elements. These terms are only used to distinguish one constituent element from another. For example, a first constituent element may be termed a second constituent element without departing from the scope of the present disclosure. Likewise, the second constituent element may also be termed the first constituent element.

It should be understood that a constituent element, when referred to as being "coupled to" or "connected to" a different constituent element, may be directly coupled to or directly connected to the different constituent element or may be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between. The same is true for terms referring to a relationship between constituent elements. For example, the terms "between" and "directly between" and the terms "adjacent to" and "directly adjacent to" should also be construed in the same manner.

The terms used throughout the present specification are only for describing a specific embodiment and are not intended to impose any limitation on the present disclosure. A noun in singular form has the same meaning as when used in plural form, unless it has a different meaning in context. It should be understood that, throughout the present specification, the terms "include," "have," and the like are intended to indicate that a feature, a number, a step, an operation, a constituent element, a component, or any combination thereof is present, without precluding the possible presence or addition of one or more other features, numbers, steps, operations, constituent elements, components, or any combination thereof.

Unless otherwise defined, each of all the terms used throughout the present specification, including technical or scientific terms, has the same meaning as is normally understood by a person of ordinary skill in the art to which the present disclosure pertains. The term as defined in commonly used dictionaries should be construed as having the same contextual meaning as that used in the relevant field of technology and, unless otherwise explicitly defined in the present specification, should not be construed as having an excessively implied meaning or a purely literal meaning.

A desired embodiment of the present disclosure will be described in detail below with reference to the accompanying drawings.

Figure 2:
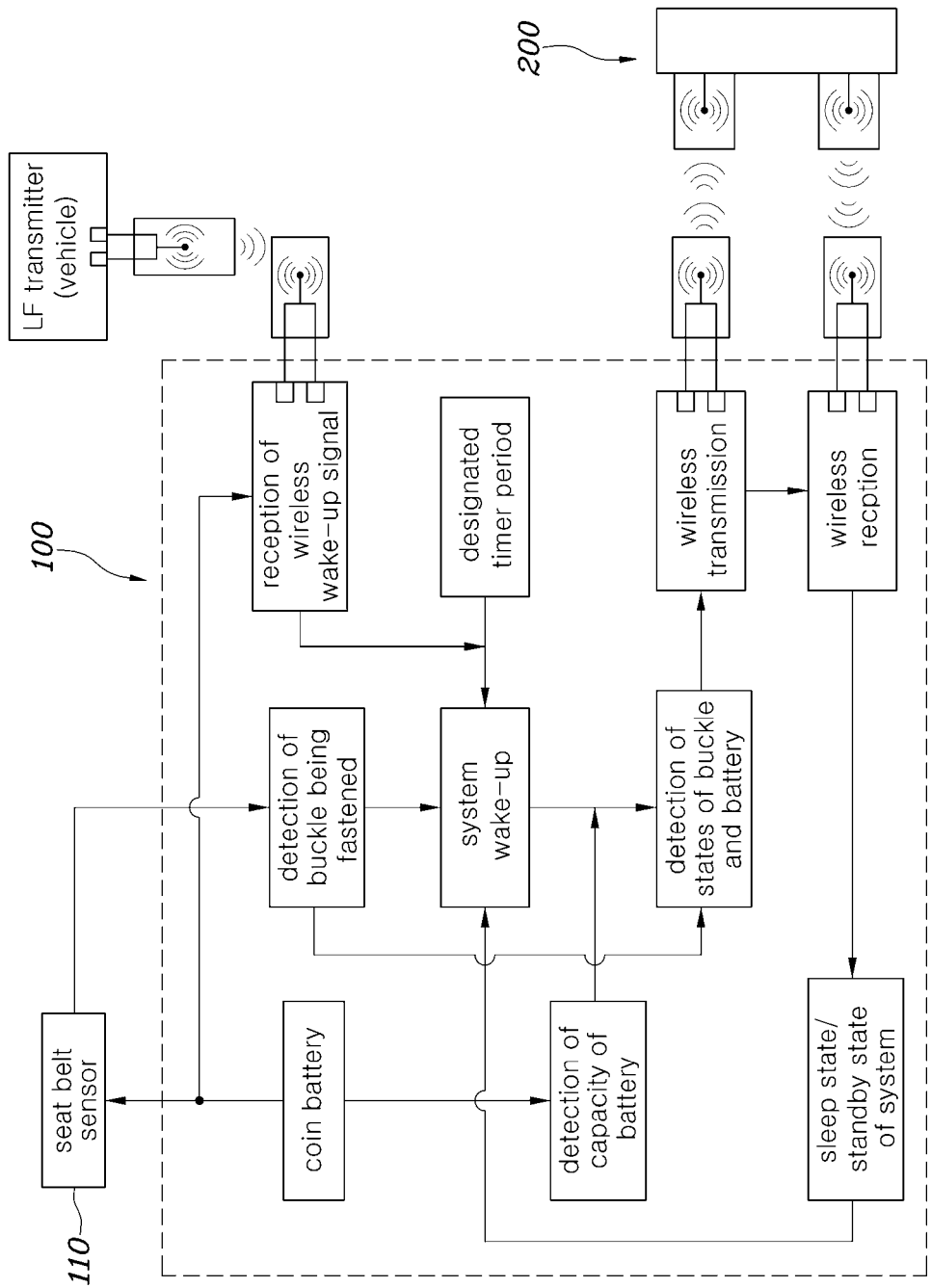
FIG. 2 is a view necessary to describe an operational relationship of a secondary controller to the system for wireless communication with a seat belt according to the present disclosure.
Figure 3:
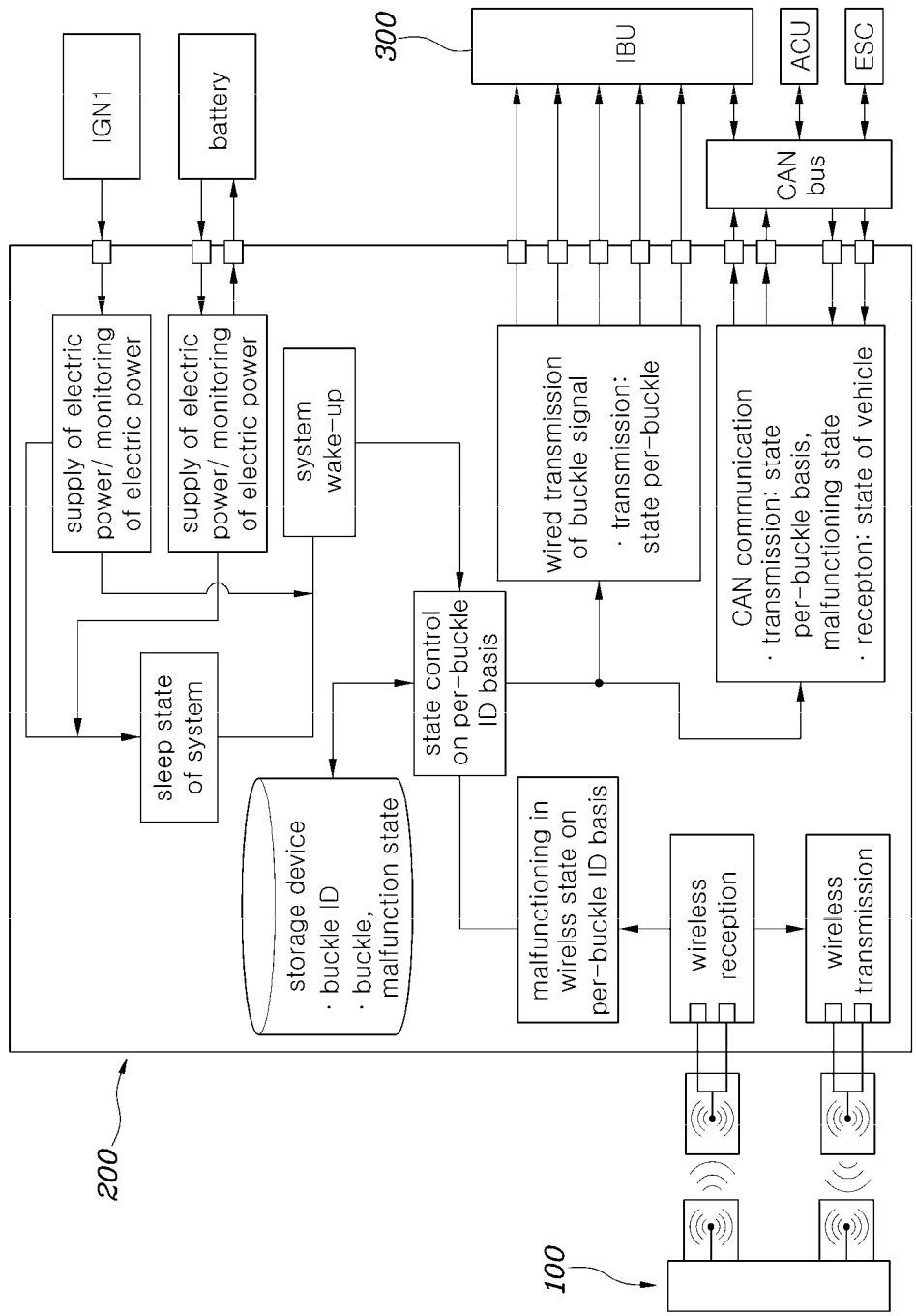
FIG. 3 is a view necessary to describe an operational relationship of a primary controller to the system for wireless communication with a seat belt according to the present disclosure.

FIG. 1 is a view schematically illustrating a configuration of a system for wireless communication with a seat belt according to the present disclosure. FIG. 2 is a view necessary to describe an operational relationship of a secondary controller 100 to the system for wireless communication with a seat belt according to the present disclosure. FIG. 3 is a view necessary to describe an operational relationship of a primary controller 200 to the system for wireless communication with a seat belt according to the present disclosure.

With reference to the drawings, the system for wireless communication with a seat belt according to the present disclosure is configured to include a seat belt sensor 110, the secondary controller 100, and the primary controller 200. The seat belt sensor 110 is provided on a per-seat basis and detects whether or not a seat belt is fastened. The secondary controller 100 is provided on a per-seat basis, wakes up through wireless communication with a vehicle, transmits through wireless communication a secondary data signal including a state of a buckle that is detected by the seat belt sensor 110 and is caused to switch to a sleep state after transmitting the secondary data signal. The primary controller 200 is provided in the vehicle, receives and stores the secondary data signal wirelessly transmitted by each of the secondary controllers 100, and transmits the stored secondary data signal to a vehicle system controller.

For example, the seat belt sensor 110 is a sensor for detecting whether or not the buckle is fastened. As the seat belt sensor 110, a buckle switch may be used.

That is, the buckle switch is turned on or off depending on whether or not a tongue 12 of a buckle 10 is fastened. Thus, a worn state of the seat belt may be detected.

Moreover, each of the secondary controllers 100 receives in the sleep state a wake-up signal wirelessly transmitted from the vehicle and is caused to switch to a wake-up state.

Then, the secondary controller 100 may detect a fastened state of the seat belt on the basis of a signal resulting from detection by the seat belt sensor 110.

In addition, each of the secondary controllers 100 wirelessly transmits the secondary data signal associated with the fastened state of the seat belt in an individual seat to the primary controller 200. After the transmission is completed, control is performed in such a manner that each of the secondary controllers 100 is caused to switch to the sleep state.

The sleep state here is a state where the secondary controller 100 does not operate and refers to a state where supplying of all electric power to the secondary controller 100 is blocked.

The primary controller 200 receives a secondary data signal wirelessly transmitted from each of the secondary controllers 100 and checks for a fastened state of the buckle 10 on the basis of the received secondary data signal.

For example, the primary controller 200 enters the wake-up state when ignition is turned on or when a door is open and enters the sleep state when the ignition is turned off or when the door is closed after the ignition is turned off.

Accordingly, in the wake-up state of the primary controller 200, an ID is assigned on a per-buckle basis, the secondary data signal wirelessly transmitted on a per-buckle ID basis is received, and the received secondary data signal is stored.

In addition, vehicle battery information and ignition information that are received within the primary controller 200 may be stored together.

For wireless communication between the primary controller 200 and the secondary controller 100, an RF transceiver and an RF receiver that are provided in the primary controller 200 and the secondary controller 100, respectively, may perform wireless transmission and reception, respectively, using Bluetooth Low Energy in a radio frequency (RF) band of 2.4 GHz. However, this wireless transmission and reception may also be performed at low power in a different RF band of 315 MHz, 433 MHz, or 425 MHz to 435 MHz.

Through CAN communication, the primary controller 200 transmits information on the state of the buckle 10 to an external vehicle control unit 300 and receives information on a state of the vehicle (a signal associated with a turned-on state of the ignition, a traveling state, a stop state, and a parking state) from the external vehicle control unit 300. The external vehicle control unit 300 here may be an integrated body unit (IBU), an airbag control unit (ACU), an electronic stability control (ESC) unit, or the like.

However, the primary controller 200 may be configured in such a manner as to provide the information on the state of the buckle to the external vehicle control unit 300 through a wire.

That is, according to the present disclosure, the secondary controller 100 provided on a per-seat basis and a single primary controller 200 provided in the vehicle are connected through wireless communication and thus a function of reminding an occupant of fastening his/her seat belt is wirelessly performed. Particularly, in a situation where wireless communication between the secondary controller 100 and the primary controller 200 is unnecessary, supplying of electric power to the secondary controller 100 is blocked by causing the secondary controller 100 to switch to the sleep state. Thus, consumption of the electric power of a battery by the secondary controller 100 is greatly reduced.

For reference, in a case where a non-worn state of the seat belt is detected, a configuration may be employed in which a warning that the non-worn state of the seat belt is entered is provided through lighting, sound (warning sound or warning voice), tactile contact (seat vibration or seat-belt vibration), or the like.

Controllers (the secondary controller 100 and the primary controller 200) according to an exemplary embodiment of the present disclosure may be realized by a nonvolatile memory (not illustrated) and a processor (not illustrated). The nonvolatile memory is configured to store data associated with an algorithm developed to control operation of each of various components of the vehicle or with a software command for executing the algorithm. The processor is configured to perform a below-described operation using the data stored in the memory. The memory and the processor here may be realized as individual chips, respectively. Alternatively, the memory and the processor may be realized as a single integrated chip. The processor may be configured as a single processor or a plurality of processors.

As illustrated in FIG. 2, according to the present disclosure, the secondary controller 100 may wirelessly receive the wake-up signal in the sleep state of the secondary controller 100 and may switch to the wake-up state.

At this time, in a case where the ignition is turned on or off, in a case where the buckle 10 is fastened in the turned-on state of the ignition or where the fastened buckle is unfastened in the turned-on state thereof, or in a case where a predetermined period elapses in the turned-on state of the ignition, the wake-up signal may be received.

For example, in a case where the vehicle starts or stalls, the secondary controller 100 may receive the wake-up signal from the vehicle.

While the vehicle is starting, in a case where the buckle 10 is fastened or where the fastened buckle 10 is unfastened, the secondary controller 100 can receive the wake-up signal from the vehicle.

In addition, while the vehicle is starting, in a case where a timer period prestored in the secondary controller 100 is reached, the wake-up signal may be received.

The wake-up signal may be transmitted through a low-frequency (LF) transmitter that is a device in the vehicle that transmits a signal at a low frequency of 125 KHz. The LF receiver may be provided in the secondary controller 100 and may receive the wake-up signal.

Particularly, for LF communication of the wake-up signal, a short-distance communication scheme is employed, and the transmission and reception of the wake-up signal is possible only within the vehicle in which the LF transmitter and the LF receiver are installed. Accordingly, unintended interruption of the wake-up signal is prevented from occurring due to a neighboring vehicle system or a high-frequency signal.

Using an LF signal as standby power, it is determined whether or not the ignition is turned on. In the case of the LF communication, a low frequency is used, and thus power consumption is minimized, thereby reducing consumption of electric power of the battery. Furthermore, the LF signal is used as the wake-up signal that varies with a change in the state of the buckle 10. Therefore, when there is no change in the state of the buckle 10, a transmission period is kept lengthened. Thus, the consumption of the electric power of the battery can be minimized.

Moreover, according to the present disclosure, after the secondary controller 100 receives the wake-up signal, the secondary controller 100 is initialized. In a case where the initialization is successful, each of the secondary controllers 100 may transmit the secondary data signal.

That is, in a case where the secondary controller 100 receives the wake-up signal, the initialization proceeds in the sleep state of the secondary controller 100. Through the initialization, a device driver, a RAM, a flash memory, and the like are checked for an error. When the initialization of the secondary controller 100 is successful, the state of preparing for transmission of the secondary data signal is entered.

Moreover, the secondary data signal for the state of the buckle 10 may be a signal for the fastened state of the buckle 10.

In addition, the secondary data signal may further include a signal for a state of the battery built into the secondary controller 100 and a signal for a malfunctioning state of each of the secondary controllers 100.

For example, the battery is built into each of the secondary controllers 100, and the battery may be a coin battery.

Specifically, after the secondary controller 100 is initialized, in a case where the state of preparing for the transmission of the secondary data signal is entered, it is determined whether or not the buckle 10 is fastened, in what state the battery is, or whether or not the secondary controller 100 malfunctions.

At this point, the battery is checked for a state thereof to detect a capacity thereof. In a case where a voltage of the battery is detected and where the capacity of the battery is at or below a capacity limit, a signal including a battery replacement alert may be transmitted.

According to the present disclosure, in a case where the secondary data signal transmitted by the secondary controller 100 is properly received by the primary controller 200, the secondary controller 100 may switch to the sleep state.

For example, the secondary controller 100 converts the secondary data signal, which carries information associated with the fastened state of the buckle 10, the state of the battery, and the malfunctioning state of the secondary controller 100, into a packet format for transmitting a message and transmits the message in the packet format to the primary controller 200 through wireless communication (an RF wireless technology: Bluetooth).

Accordingly, when the primary controller 200 properly receives the message, thereby completing the transmission thereof, the secondary controller 100 is caused to switch to the sleep state. Thus, in a situation where wireless communication is not performed, the supplying of electric power to the secondary controller 100 is blocked, thereby reducing the consumption of the electric power of the battery.

Moreover, in a case where the secondary data signal that is transmitted by the secondary controller 100 is properly received by the primary controller 200, the primary controller 200 may wirelessly transmit a reception acknowledgement signal to the secondary controller 100.

For example, when the primary controller 200 properly receives the massage, the primary controller 200 transmits an acknowledgement signal acknowledging the proper reception of the massage transmitted by the secondary controller 100. The secondary controller 100 receives the acknowledgement signal transmitted by the primary controller 200.

Moreover, in a case where the wake-up signal received by the secondary controller 100 is a wake-up signal indicating that the ignition is turned off or on or indicating the fastened state of the buckle 10, a wake-up signal transmission timer of the secondary controller 100 may be turned on, and thus the secondary controller 100 may switch to the sleep state.

For example, in a case where the wake-up signal that wakes up the secondary controller 100 is a wake-up signal indicating a starting state of the vehicle or the fastened state of the seat belt, the wake-up signal transmission timer is turned on thereafter to periodically check whether or not the buckle 10 is fastened.

Therefore, after the secondary controller 100 is caused to switch to the sleep state, although an event, such as turning-on or -off of the ignition or fastening of the buckle 10, does not occur, the wake-up signal is set to be transmitted to the secondary controller 100 with every period that is set by the wake-up signal transmission timer. Accordingly, the state of the buckle 10, the state of the battery, and the like are periodically checked for.

Conversely, according to the present disclosure, in a case where the primary controller 200 does not properly receive the secondary data signal, the secondary controller 100 retransmits the secondary data signal. When the number of times the secondary data signal is retransmitted is greater than a predetermined number of times, the secondary controller 100 may switch to the sleep state.

For example, when the message, which is transmitted by the secondary controller 100, is not properly received by the primary controller 200, the primary controller 200 cannot transmit the acknowledgement signal to the secondary controller 100. In this cases, the secondary controller 100 cannot receive the acknowledgement signal. Thus, the secondary controller 100 recognizes that the transmission of the massage fails. Accordingly, the secondary controller 100 retransmits the massage.

An attempt is made a predetermined number of times to retransmit the massage. When the predetermined number of times is exceeded, the transmission of the massage is recorded as resulting in failure.

At this point, in a case where a specific secondary controller 100 fails to transmit the massage, the specific secondary controller 100 is diagnosed as malfunctioning. In a case where wireless transmission and reception between each of the secondary controllers 100 and the primary controller 200 all fails, the secondary controllers 100 and the primary controller 200 may be diagnosed as having problems, such as the situation where the wireless transmission and reception is not properly performed.

Subsequently, when the massage is retransmitted more than the predetermined number of times, control is performed in such a manner that the secondary controller 100 is caused to switch to the sleep state.

In a case where the number of times the massage is retransmitted is greater than the predetermined number of times, but the retransmission of the message results in failure, the secondary controller 100 may also switch to the sleep state. Thus, in a situation where the wireless communication is not performed, the supplying of electric power to the secondary controller 100 is blocked, thereby reducing the consumption of the electric power of the battery.

Figure 4:
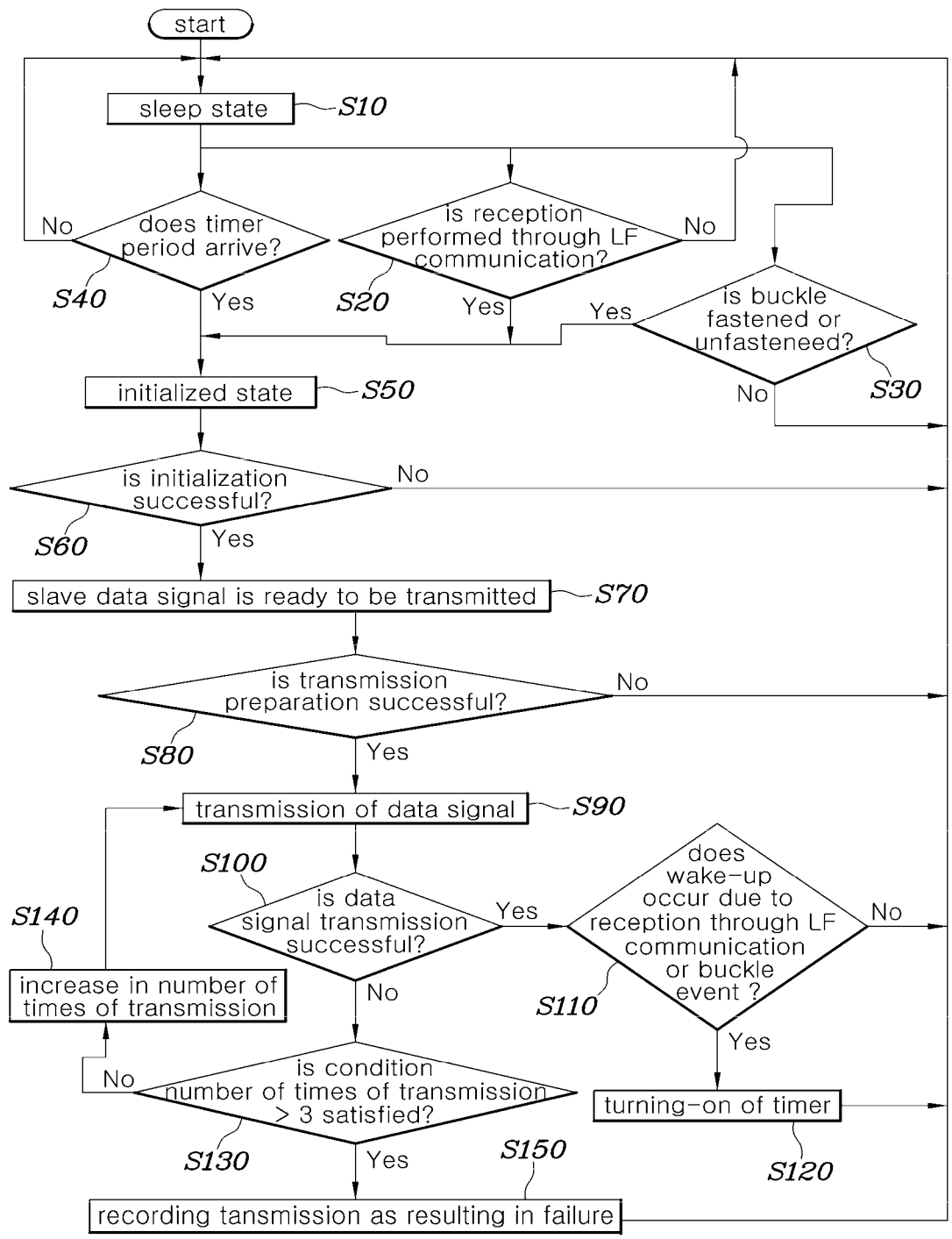
FIG. 4 is a flowchart illustrating steps of a method of wireless communication with a seat belt according to the present disclosure.

FIG. 4 is a flowchart illustrating control steps of a method of wireless communication with a seat belt according to the present disclosure.

With reference to the drawings, the method of wireless communication with a seat belt according to the present disclosure is configured to include a step of causing each secondary controller 100 to wake up through wireless communication in a sleep state of the each secondary controller 100; a step of transmitting, by the each secondary controller 100, a secondary data signal including a state-of-a-buckle signal resulting from detection by a seat belt sensor 110 provided on a per-seat basis, through the wireless communication; a step of receiving and storing, by a primary controller 200, the secondary data signal wirelessly transmitted from the each secondary controller 100 and transmitting, by the primary controller 200, the stored secondary data signal to a vehicle system controller; and a step of causing the secondary controller 100 to switch to the sleep state after the secondary data signal is transmitted.

The steps of wireless communication with a seat belt according to the present disclosure will be described below with reference to FIG. 4.

Whether or not the secondary controller 100 receives a wake-up signal in the sleep state of the secondary controller 100 is monitored (S10).

For example, whether or not an LF signal that varies according to whether ignition is turned on or off is received, whether or not a signal for fastening a buckle or unfastening the fastened buckle is received, or whether or not a preset timer period is reached is monitored (S20, S30, and S40).

Accordingly, in a case where any one of the above conditions is satisfied, each secondary controller 100 receives the wake-up signal from a vehicle. When the wake-up signal is received, initialization proceeds in the sleep state of the secondary controller 100 (S50).

Accordingly, it is determined whether or not the initialization of the secondary controller 100 is successful (S60). When the initialization is successful, in preparation for transmission after the initialization, the secondary data signal associated with a fastened state of a seat belt, a state of a battery, and a malfunctioning state of the secondary controller 100 is converted into a packet format for transmitting a message (S70).

Subsequently, when the message is ready to be transmitted (S80), each secondary controller 100 transmits the message (S90), and it is determined whether the transmitted message is properly received by the primary controller 200 (S100).

When the result of the determination in S100 is that data contained in the message transmitted by the secondary controller 100 are properly received by the primary controller 200, the secondary controller 100 receives from the primary controller 200 an acknowledgement signal indicating that the data contained in the transmitted message are precisely received by the primary controller 200.

Subsequently, the wake-up signal for switching from a sleep state to the wake-up state is determined (S110).

In a case where the result of the determination in S110 is that the wake-up signal is for switching to a fastened state of a buckle 10 or to an unfastened state of the fastened buckle 10, or in a case where the wake-up signal is a wake-up signal resulting from wireless transmission and reception of an LF signal, a timer is turned on, and then the secondary controller 100 is caused to switch to the sleep state (S120). In the case of other wake-up signals, switching to the sleep state takes place immediately.

Conversely, in a case where the result of the determination in S100 is that the message is not properly received, the secondary controller 100 retransmits the message.

Subsequently, it is determined whether or not the number of times the message that is not properly received by the primary controller 200 is retransmitted is greater than 3 (S130). When the number of times the message is retransmitted is 3 or smaller, the number of times the message is retransmitted is counted and is accumulated (S140). When the number of times the message is retransmitted is greater than 3, the transmission of the massage is recorded as resulting in failure (S150). Then, the secondary controller 100 is caused to switch to the sleep state.

As described above, according to the present disclosure, the secondary controller 100 provided on a per-seat basis and a single primary controller 200 provided in the vehicle are connected to each other through wireless communication. Thus, the function of reminding an occupant of fastening his/her seat belt is wirelessly performed. Particularly, in a situation where the wireless communication between the secondary controller 100 and the primary controller 200 is unnecessary, supplying of electric power to the secondary controller 100 is blocked by causing the secondary controller 100 to switch to the sleep state. Thus, the consumption of the electric power supplied from the battery to the secondary controller 100 is greatly reduced.

Only the specific embodiment of the present disclosure are described in detail, but it is apparent to a person of ordinary skill in the art that various modifications and alterations are possible within the scope of the technical idea of the present disclosure. Of course, these modifications and alterations also fall within the scope of the following claims.

The invention claimed is:

1. A system for wireless communication with a seat belt comprising:
   a seat belt sensor provided on a per-seat basis and configured to detect whether a seat belt is fastened;
   a secondary controller provided on a per-seat basis and configured to wake up through wireless communication with a vehicle, to transmit a secondary data signal comprising a state of a buckle detected by a seat belt sensor through the wireless communication, and configured to switch to a sleep state after the secondary data signal is transmitted; and
   a primary controller provided in the vehicle and configured to receive and store the secondary data signal wirelessly transmitted by each of the secondary controllers, and configured to transmit the stored secondary data signal to a vehicle system controller;
   wherein the secondary controller switches to the sleep state when the primary controller does not properly receive the secondary data signal, when the secondary controller retransmits the secondary data signal, and, when the number of times the secondary data signal is retransmitted is greater than a predetermined number of times.

2. The system of claim 1, wherein the secondary controller wirelessly receives a wake-up signal in a sleep state of the secondary controller and switches to a wake-up state.

3. The system of claim 2, wherein the wake-up signal is received when ignition is turned on or off, when the buckle is fastened in a turned-on state of the ignition or when the fastened buckle is unfastened in the turned-on state thereof, or when a predetermined period elapses in the turned-on state of the ignition.

4. The system of claim 1, wherein the secondary controller is initialized after the secondary controller receives the wake-up signal, and when the initialization is successful, each of the secondary controller transmits the secondary data signal.

5. The system of claim 1, wherein the secondary data signal for the state of the buckle is a signal for a fastened state of the buckle.

6. The system of claim 1, wherein the secondary data signal further comprises a signal for a state of a battery built into the secondary controller and a signal for a malfunctioning state of each of the secondary controllers.

7. The system of claim 1, wherein the secondary controller switches to the sleep state when the primary controller properly receives the secondary data signal.

8. The system of claim 1, the primary controller wirelessly transmits a reception acknowledgement signal to the secondary controller when the mater controller properly receives the secondary data signal.

9. The system of claim 7, wherein a wake-up signal transmission timer of the secondary controller is turned on and then the secondary controller switches the sleep state when the wake-up signal received by the secondary controller is a wake-up signal indicating that ignition is turned on or off or indicating a fastened state of the buckle.

10. The system of claim 1, wherein when the wireless communication between the secondary controller and the primary controller is unnecessary, supplying of electric power to the secondary controller is blocked by causing the secondary controller to switch to the sleep state.

11. The system of claim 1, wherein the wake-up signal is transmitted through a low-frequency (LF) transmitter that is a device in the vehicle that transmits a signal at a low frequency, and is received through an LF receiver provided in the secondary controller.

12. A method of wireless communication with a seat belt comprising:
    causing each secondary controller to wake up through wireless communication in a sleep state of the each secondary controller;
    transmitting, by the each secondary controller, a secondary data signal comprising a state-of-a-buckle signal resulting from detection by a seat belt sensor provided on a per-seat basis, through the wireless communication;
    receiving and storing, by a primary controller, the secondary data signal wirelessly transmitted from the each secondary controller and transmitting, by the primary controller, the stored secondary data signal to a vehicle system controller;
    causing the secondary controller to switch to the sleep state after the secondary data signal is transmitted; and
    causing the secondary controller to switch to the sleep state when the primary controller does not properly receive the secondary data signal, when the secondary controller retransmits the secondary data signal, and, when the number of times the secondary data signal is retransmitted is greater than a predetermined number of times.

* * * * *